(12) United States Patent
Hambergen (10) Patent No.: US 8,814,447 B1
(45) Date of Patent: Aug. 26, 2014

(54) MOVEABLE LENS ASSEMBLY WITHIN A DISPLAY BEZEL OF A COMPUTING DEVICE

(75) Inventor: William Hambergen, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 518 days.

(21) Appl. No.: 13/152,732

(22) Filed: Jun. 3, 2011

Related U.S. Application Data (60) Provisional application No. 61/452,442, filed on Mar. 14, 2011.

(51) Int. Cl.
*G03B 17/04* (2006.01)

(52) U.S. Cl.
USPC .......................................................... 396/348

(58) Field of Classification Search
USPC .......................................... 396/348; 348/373
See application file for complete search history.

(56) References Cited

U.S. PATENT DOCUMENTS

| | | | |
|---|---|---|---|
| 6,161,944 A | 12/2000 | Leman | |
| 7,057,888 B2 | 6/2006 | Oakley | |
| 7,088,916 B2 | 8/2006 | Nomura | |
| 7,633,693 B2 | 12/2009 | Hung et al. | |
| 7,677,815 B2 | 3/2010 | Lane et al. | |
| 7,785,021 B2 | 8/2010 | Kato | |
| 8,432,485 B1 * | 4/2013 | Martinez et al. | 348/373 |
| 2006/0152894 A1 | 7/2006 | Moengen | |
| 2008/0008462 A1 * | 1/2008 | Klinghult | 396/53 |
| 2008/0085112 A1 | 4/2008 | Lane et al. | |
| 2009/0316348 A1 * | 12/2009 | Tseng et al. | 361/679.28 |
| 2010/0134421 A1 * | 6/2010 | Challener et al. | 345/173 |
| 2013/0141854 A1 * | 6/2013 | Behar et al. | 361/679.09 |

\* cited by examiner

*Primary Examiner* — Rodney Fuller
(74) *Attorney, Agent, or Firm* — Brake Hughes Bellermann LLP (57) ABSTRACT

In one general aspect, the computing device can include a base portion, and a display portion moveably coupled to the base portion, the display portion including a display bezel and an image sensor disposed within the display bezel. The computing device can also include an extension member coupled to the display portion and associated with a lens. The extension member can be configured to move at least a portion of the lens in a direction away from the image sensor to a position disposed outside of the display bezel and to move the portion of the lens in a direction towards the image sensor to a position disposed within the display bezel.

23 Claims, 6 Drawing Sheets

MOVEABLE LENS ASSEMBLY WITHIN A DISPLAY BEZEL OF A COMPUTING DEVICE

RELATED APPLICATION

This application claims priority to and the benefit of U.S. Provisional Application No. 61/452,442, filed on Mar. 14, 2011, and entitled "Moveable Lens Assembly within a Display Bezel of a Computing Device", which is hereby incorporated by reference in its entirety.

TECHNICAL FIELD

This description relates to a moveable lens assembly within of a computing device.

BACKGROUND

Many known computing devices (e.g., cellphones, tablets, laptop computers) can have several mechanisms through which a user may interact with and/or use (e.g., trigger) one or more functions of the computing device. Specifically, image capture devices (e.g., camera devices, video cameras, webcams), through which a user may perform one or more computing functions such as video conferencing, can be integrated into a computing device. These image capture devices are often integrated into a bezel of a display of the computing device, and consequently, the allowable depth of the camera/lens assembly is generally limited to the depth (e.g., thickness) of the display-bezel assembly. Thus, in displays with relatively thin bezels, the camera/lens assembly can have a limited size that also limits the image capture quality and capabilities of the image capture device included therein. For example, while cameras with a very small objective lens and sensor can be accommodated in a thin display bezel, such cameras have limited resolution and light gathering ability.

SUMMARY

In one general aspect, the computing device can include a base portion, and a display portion moveably coupled to the base portion, the display portion including a display bezel and an image sensor disposed within the display bezel. The computing device can also include an extension member coupled to the display portion and associated with a lens. The extension member can be configured to move at least a portion of the lens in a direction away from the image sensor to a position disposed outside of the display bezel and to move the portion of the lens in a direction towards the image sensor to a position disposed within the display bezel.

In another general aspect, a computing device a base portion including an input region, and a display portion movably coupled to the base portion. The display portion can include a display bezel around a display and can include an image sensor disposed within the display bezel. The computing device can also include an extension member associated with a lens and configured to be in a stowed position when the display portion and base portion collectively define a closed configuration where the display surface faces the input region of the base portion. The extension member can be configured to be in a deployed position when the display portion and the base portion collectively define an open configuration after the display portion is rotated away from the base portion. The lens and the image sensor can be separated by a distance when in the deployed position that is greater than a distance between the lens and the image sensor when the extension member is in the stowed position.

In yet another general aspect, a computer-readable storage medium can store instructions that when executed cause a computing device to perform a process. The instructions can include instructions to detect that a display portion of the computing device is in an open position with respect to a base portion of the computing device. The instructions can include instructions to receive, from an application operating at the computing device, an instruction to change an activation state of an image sensor disposed within a display bezel of the display portion. The instructions can also include instructions to trigger, in response to the instruction, activation of a movement mechanism configured to move the extension member between a stowed position where a lens disposed within the extension member is disposed within the display bezel of the display portion and a deployed position where the lens is disposed outside of the display bezel.

In yet another general aspect, an apparatus can include a display bezel around a display surface of a tablet computing device and including an image sensor disposed within the display bezel. The apparatus can also include an extension member coupled to the display bezel and including a lens. The extension member can be configured to move at least a portion of the lens in a direction away from the image sensor to a position disposed outside of the display bezel and to move the at least the portion of the lens in a direction towards the image sensor to a position disposed within the display bezel.

The details of one or more implementations are set forth in the accompanying drawings and the description below. Other features will be apparent from the description and drawings, and from the claims.

DETAILED DESCRIPTION

Figure 1A:
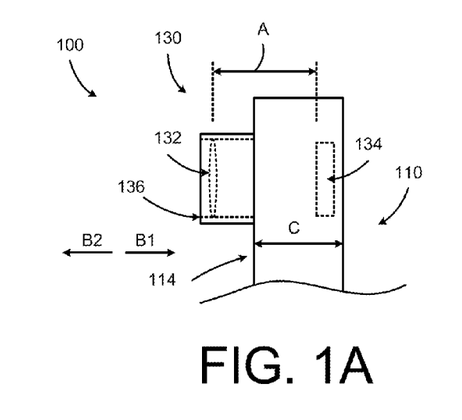
FIGS. 1A and 1B are diagrams that each illustrate of a side view of a top portion of display bezel of a display portion of a computing device.
Figure 1B:
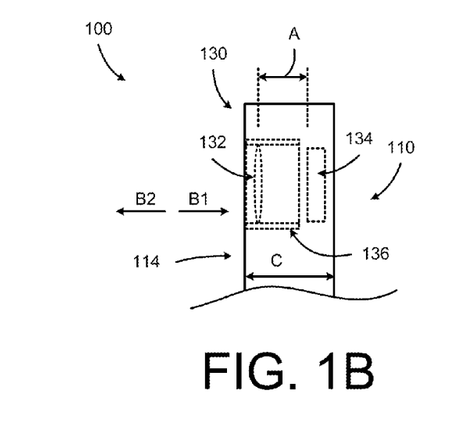
Figure 1C:
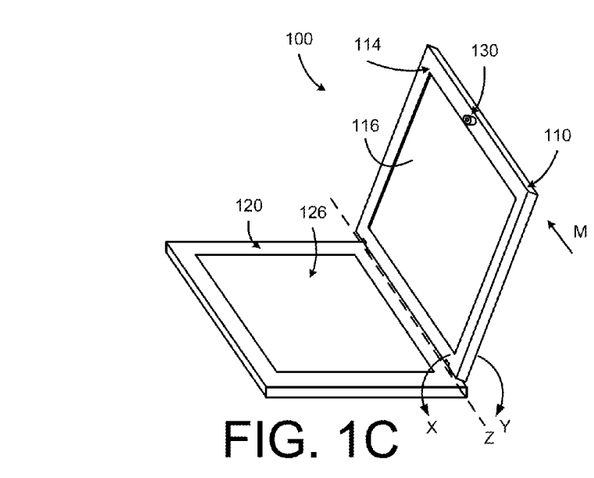
FIGS. 1C and 1D are diagrams of the computing device in an open configuration and in a closed configuration, respectively.
Figure 1D:
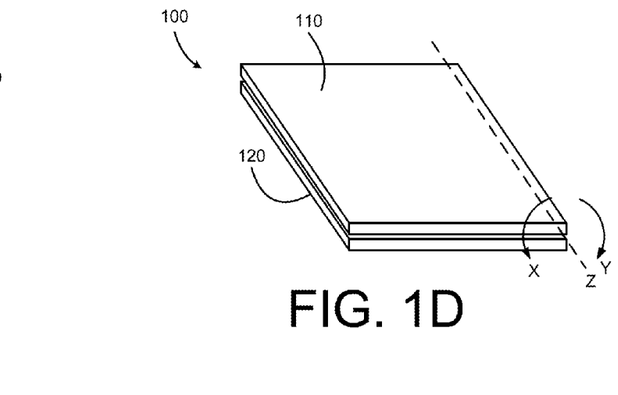

FIGS. 1A and 1B are diagrams of a side view of a top portion of a display bezel 114 of a display portion 110 of a computing device 100. Diagrams of the computing device 100 with the display portion 110 operably coupled (e.g., removably coupled, rotatably coupled) to a base portion 120 are shown in FIGS. 1C and 1D. FIGS. 1A and 1B are diagrams of the top portion of the display bezel 114 of the display portion 110 of the computing device 100 as viewed from direction M (shown in FIG. 1C). As shown in FIG. 1C, the base portion 120 includes an input device region 126, and the display bezel 114 of the display portion 110 is disposed around a display 116. In other words, at least a portion of the display 116 is disposed within at least a portion of the display bezel 114. FIGS. 1C and 1D are diagrams of the computing device 100 in an open configuration and in a closed configuration, respectively.

As shown in FIGS. 1A and 1B, the computing device 100 has an image capture device 130 (or multiple image capture devices) that includes an extension member 136 coupled to the display portion 110 and associated with (e.g., coupled to, including) a lens 132. The computing device 100 also has an image sensor 134 disposed within the display bezel 114 of the display portion 110. In some embodiments, the image sensor 134 can be, for example, a charge-coupled device (CCD) sensor, a complementary metal-oxide-semiconductor (CMOS) sensor, an active pixel sensor, and/or so forth. The extension member 136 is oriented so that light may be gathered through the lens 132 and focused onto the image sensor 134, which is distal to the lens 132 and which is disposed within the display portion 110.

In some embodiments, the image capture device 130 can be, for example, a still image capture device, a video camera, a web cam, and/or so forth. The image capture device 130 can be configured to operate in conjunction with one or more computing functions associated with the computing device 100, for example, image capture applications, videoconferencing applications (e.g., video-phone applications), photo editing applications, security camera applications, and/or so forth.

As shown in FIGS. 1A and 1B, the image capture device 130 is a retractable image capture device. Specifically, the image capture device 130 can be moved (e.g., slidably moved, translated, axially translated) between a deployed configuration (also can be referred to as an extended configuration) shown in FIG. 1A and a stowed configuration (also can be referred to as a retracted configuration) shown in FIG. 1B. The image capture device 130 is configured to be moved (e.g., changed, retracted, translated) from the deployed configuration to the stowed configuration when the extension member 136 is moved along direction B1. The image capture device 130 is configured to be moved (e.g., changed, translated, deployed) from the stowed configuration to the deployed configuration when the extension member 136 is moved along direction B2.

The image capture device 130 can be configured to be moved (e.g., actively moved) between the stowed configuration and the deployed configuration (e.g., one or more deployed configurations) using, for example, a movement mechanism (e.g., a motor) (not shown) associated with the image capture device 130. The image capture device 130 can be configured to be moved between the stowed configuration and the deployed configuration using a motor coupled to, for example, a pulley, a gear, and/or a spring-loaded mechanism, and/or so forth. Thus, the image capture device 130 can be an active device that includes a movement mechanism configured to move the image capture device 130 between the stowed configuration and the deployed configuration.

In some embodiments, the image capture device 130 can be configured to be moved between the stowed configuration and the deployed configuration in response to a force (e.g., an outside force) applied to the image capture device 130. In other words, the image capture device 130 can be a passive device configured to be moved by an outside force applied to the image capture device 130. For example, a user can move the image capture device 130 from the deployed configuration to the stowed configuration by pushing the extension member 136 along the direction B1. The image capture device 130 can be configured so that the user can pull (along direction B2) the extension member 136 so that the image capture device 130 is moved from the stowed configuration to the deployed configuration.

When the image capture device 130 is moved (e.g., translated) from the deployed configuration (shown in FIG. 1A) to the stowed configuration (shown in FIG. 1B), at least a portion of the lens 132 associated with (e.g., included within) the extension member 136 is moved from a position outside of the display bezel 114 (as shown in FIG. 1A) to a position disposed within the display bezel 114 (as shown in FIG. 1B). Also, at least a portion of the lens 132 included within the extension member 136 is moved toward the image sensor 134, so that a distance A (which can be between 0.1 millimeter (mm) and a few centimeters (cm)) between the lens 132 and the image sensor 134 is decreased. Accordingly, when the image capture device 130 is in the deployed configuration shown in FIG. 1A the distance A has a value that is greater than a value of the distance A when the image capture device 130 is in the stowed configuration shown in FIG. 1B.

When the image capture device 130 is moved from the stowed configuration (shown in FIG. 1B) to the deployed configuration (shown in FIG. 1A), at least a portion of the lens 132 associated with (e.g., included within) the extension member 136 is moved from a position within the display bezel 114 (as shown in FIG. 1B) to a position disposed outside of the display bezel 114 (as shown in FIG. 1A). Also, the lens 132 included within the extension member 136 is moved away from the image sensor 134, so that a distance A between the lens 132 and the image sensor 134 is increased. Accordingly, when the image capture device 130 is in the stowed configuration shown in FIG. 1B the distance A has a value that is less than a value of the distance A when the image capture device 130 is in the deployed configuration shown in FIG. 1A.

As shown in FIG. 1A, the distance A, when the image capture device 130 is in the deployed configuration, is greater than a thickness C of the display bezel 114. As shown in FIG. 1B, the distance A, when the image capture device 130 is in the stowed configuration, is less than the thickness C of the display bezel 114. In some embodiments, the distance A between the lens 132 and the image sensor 134 may be smaller than the thickness C of the display bezel 114 when the image capture device 130 is in the stowed configuration and the deployed configuration. However, in such embodiments, the distance A will still increase when the image capture device 130 is moved (e.g., translated) from the stowed configuration to the deployed configuration.

Because the image capture device 130 is retractable (e.g., can be moved from the stowed configuration to the deployed configuration), the lens 132 (e.g., objective lens) can be a relatively large lens with corresponding light gathering (e.g., transmission) capabilities (e.g., relatively large light gathering capabilities). Specifically, the increased distance A between the image sensor 134 and the lens 132 of the extension member 136 when the image capture device 130 is moved from the stowed configuration to the deployed configuration can optically enable the use of a larger lens 132 than would otherwise be possible with an image capture device that does not have an extension member.

With the extension capability of the image capture device 130, which can increase the distance between the lens 132 and the image sensor 134 to a relatively large distance (e.g., a distance greater than a thickness of the display bezel 114), the lens 132 can be a relatively large (and high quality) lens despite the display bezel 114 being relatively thin in some embodiments. This can be an advantage for embodiments where the computing device 100 is relatively thin. Accommodating a high-quality camera within a relatively thin display bezel may be optically impossible if the camera assembly is entirely disposed within a thin display bezel without extension capabilities. In some embodiments, a relatively large, retractable lens mechanism (such as that provided by the extension member 136) may allow for replacement of small-pixeled image sensors (which can be expensive) with higher performing image sensors (which can be less expensive) or with larger pixels that can provide, for example, improved depth of field capabilities, low light performance, and/or so forth. Accordingly, the image sensor 134 can be a relatively large and/or high-performance image sensor.

As mentioned above, FIGS. 1C and 1D are diagrams of the computing device 100 in an open configuration and in a closed configuration, respectively. When the computing device 100 is in the open configuration, the display portion 110 can be referred to as being in an open position with respect to the base portion 120. The display 116 of the display portion 110 does not directly face the input device region 126 of the base portion 120 when the computing device 100 is in the open configuration. The display 116 of the display portion 110 can be viewed by a user when the computing device 100 is in the open configuration. Similarly, the input device region 126 of the base portion 120 can also be accessed and used (e.g., used by a user) to trigger one more functions of the computing device 100 when the computing device 100 is in the open configuration. The display 116 of the display portion 110 is aligned along a plane that is nonparallel to a plane along which the base portion 120 (e.g., a bottom surface and/or a top surface of the base portion 120) is aligned when the computing device 100 is in the open configuration. Although not shown, the input region 126 can include various types of input devices such as, for example, a keyboard, one or more buttons, an electrostatic touchpad to control a mouse cursor, etc.

When the computing device 100 is in the closed configuration, the display portion 110 can be referred to as being in a closed position with respect to the base portion 120. The display 116 of the display portion 110 of the computing device 100 faces (and may cover) the input region 126 of the base portion 120 of the computing device 100 when the computing device 100 is in the closed configuration. When in the closed configuration, the display portion 110 (or the display surface of the display 116) can be aligned along a plane that is substantially parallel to a plane along which the base portion 120 (e.g., a bottom surface and/or a top surface of the base portion 120) is aligned. In some embodiments, the display portion 110 (e.g., the display bezel 114) may be contacting (or nearly contacting) the base portion 120 when the computing device 100 is in the closed configuration.

The computing device 100 can be moved from the open configuration shown in FIG. 1C to the closed configuration shown in FIG. 1D by rotating (e.g., rotatably moving) the display portion 110 in a counterclockwise direction X with respect to the base portion 120. Also, the computing device 100 can be moved (e.g., rotatably move) from the closed configuration shown in FIG. 1D to the open configuration shown in FIG. 1C by rotating the display portion 110 in a clockwise direction Y with respect to the base portion 120. The display portion 110 is configured to rotate about an axis Z, which can be through one or more hinge portions (not shown) used to couple the display portion 110 to the base portion 120.

In some embodiments, the display portion 110 may not be operably coupled to the base portion 120. In such embodiments, the display portion 110 can be a standalone component that may be coupled to the base portion 120, which can also be a standalone component.

Although not shown in FIGS. 1C and 1D, the computing device 100 can have many open configurations, where the display 116 of the display portion 110 is aligned along a plane that is nonparallel to a plane along which the base portion 120 is aligned. In other words, the display portion 110 can be moved between various open positions with respect to the base portion 120 where the display 116 may be viewed and/or the input device region 126 may be accessed by, for example, a user.

When the computing device 100 is in the open configuration shown in FIG. 1C, the image capture device 130 can be in the deployed configuration shown in FIG. 1A or in the stowed configuration shown in FIG. 1B. In other words, image capture device 130 can be moved between the deployed configuration and the stowed configuration using, for example, a movement mechanism (e.g., a motor) (and associated software and/or hardware), in response to the force applied by a user, and/or so forth.

When the computing device 100 is in the closed configuration shown in FIG. 1D, image capture device 130 can be in the stowed configuration shown in FIG. 1B. Because the display portion 110 (e.g., the display bezel 114) may be contacting (or nearly contacting) the base portion 120 when the computing device 100 is in the closed configuration, the image capture device 130 may not be in the deployed configuration where at least a portion (e.g., a media portion) of the extension member 136 may be disposed outside of the display bezel 114. The computing device 100 can be configured so that the image capture device 130 (if the image capture device 130 is in the deployed configuration when the computing device 100 is in the open configuration) will be moved to the stowed configuration while, or in response, to the computing device 100 being moved to the closed configuration shown in FIG. 1D.

For example, the image capture device 130 may be in the deployed configuration when the computing device 100 is in the open configuration. In response to the computing device 100 starting to move toward the closed configuration, the image capture device 130 may be automatically moved by a motor to the stowed configuration before the computing device 100 reaches the closed configuration. In some embodiments, the image capture device 130 may be moved to the stowed configuration as the extension member 136 comes into contact with at least a portion of the base portion 120 of the computing device 100 as the computing device 100 is being closed until the computing device 100 is in the closed configuration. In other words, image capture device 130 may be moved to the stowed configuration by the closing of the computing device 100. More details related to mechanisms for moving the image capture device 130 between the deployed configuration the stowed configuration are described, for example, in connection with FIGS. 2A through 6.

In some embodiments, the lens 132 may be fixedly coupled or movably coupled within the extension member 136. For example, although not shown in FIGS. 1A through 1D, the lens 132 may be coupled to, for example, a focus mechanism and/or a zoom mechanism that is also coupled within the extension member 136. In some embodiments, the extension member 136 can be configured to function as a focus mechanism and/or as a zoom mechanism for the image capture device 130.

Although not shown in FIGS. 1A and 1B, in some embodiments, multiple lenses (e.g., one or more of the lenses could be fixed with respect to an image sensor) or other light transmitting (e.g., passing) components, may be associated with the image capture device 130. For example, one or more lenses and/or components configured to pass electromagnetic radiation may be disposed between the lens 132 and the image sensor 134 and/or proximal to (e.g., in front of) the lens 132.

Although not shown in FIGS. 1A and 1B, in some embodiments, the lens 132 may not be disposed within the extension member 136. For example, at least a portion of the lens 132 may be disposed proximal to (to the left of) the extension member 136. In some embodiments, at least a portion of lens 132 may be coupled to a proximal end of the extension member 136.

When the image capture device 130 is in the deployed configuration, the extension member 136 is in a deployed position where at least a portion (e.g., a medial portion) of the extension member 136 is disposed outside of the display bezel 114. In other words, when in the deployed configuration, a portion (e.g., a medial portion) of the extension member 136 may be disposed on one side (e.g., on one side of a wall) of the display bezel 114 and another portion of the extension member 136 may be disposed on another side (e.g., on another side of a wall) of the display bezel 114.

In some embodiments, the extension member 136 can have a variety of shapes and/or sizes. For example, the extension member 136 can have a different shape (or outer profile) than that shown in FIG. 1A through 1C. For example, the extension member 136 can have a rectangular shape (or outer profile), a square shape (or outer profile), a circular shape (or outer profile), and so forth. Although shown as a single component in FIGS. 1A and 1B, in some embodiments, the extension member 136 can include multiple different components. For example, the extension member 136 can be a telescoping extension member that includes several concentric (e.g., concentrically sliding) components.

In some embodiments, the image capture device 130 (or a portion thereof) may be in a particular activation state—an active state (e.g., may be turned off) or in an inactive state (e.g., may be turned on)—when the image capture device 130 is in the deployed configuration and/or the stowed configuration. For example, when the image capture device 130 is in the deployed configuration, the image capture device 130 (e.g., the image sensor 134 of the image capture device 130) may be in an inactive state so that the image capture device 130 may not capture one or more images until the image capture device 130 is activated in response to, for example, an application triggered by a user. As another example, the image capture device 130 can be configured so that the image capture device 130 is automatically changed to (or maintained in) an active state when the image capture device 130 is in the deployed configuration. More details related to activation states of the image capture device 130 when in various configurations are described in connection with the figures below.

In some embodiments, the display 116 of the computing device 100 can have a display surface (also can be referred to as a viewable surface) upon which illuminated objects can be displayed and viewed by a user. In some embodiments, the display 116 included in the display portion 110 can be, for example, a touch sensitive display. In some embodiments, the display 116 can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If a touch sensitive device, the display 116 can function as an input device. For example, the display 116 can be configured to display a virtual keyboard (e.g., emulate a keyboard) that can be used by a user as an input device.

Although not shown, in some embodiments, the display portion 110 and/or the base portion 120 can include various computing components (e.g., internal computing components) such as one or more processors, a graphics processor, a motherboard, a memory (e.g., a disk drive, a solid-state drive), and/or so forth. One or more images displayed on the display 116 of the display portion 110 can be triggered by the computing components included in the base portion 120. In some embodiments, the computing device 100 can include one or more wires configured to handle signaling (e.g., video signals, signals generated in response to interactions with the display) between the display portion 110 and the base portion 120.

As shown in FIGS. 1A through 1D, the computing device 100 can be a personal computing laptop-type device. In some embodiments, the computing device 100 can be any type of computing device. The computing device 100 can be, for example, a wired device and/or a wireless device (e.g., wi-fi enabled device) and can be, for example, a tablet-type computing device, a computing entity (e.g., a personal computing device), a server device (e.g., a web server), a mobile phone, a personal digital assistant (PDA), and/or so forth. The computing device 100 can be configured to operate based on one or more platforms (e.g., one or more similar or different platforms) that can include one or more types of hardware, software, firmware, operating systems, runtime libraries, and/or so forth. More details related to various configurations of a computing device that has a display portion configured to move with respect to a base portion are described in connection with the figures below.

Figure 2A:
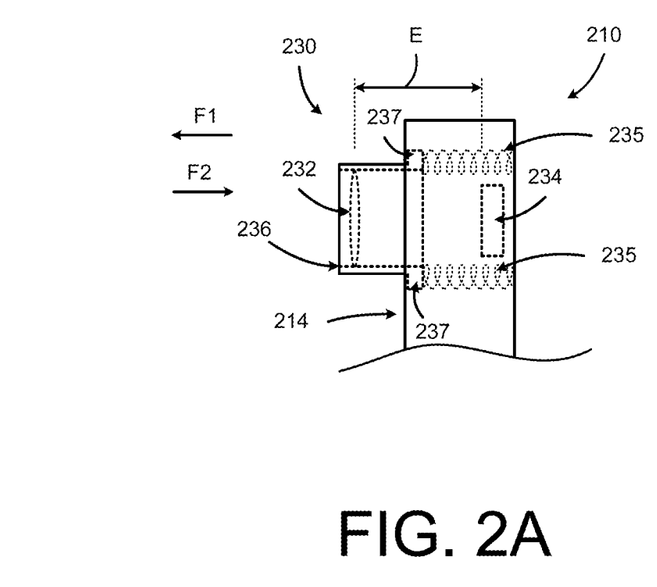
FIG. 2A is a diagram that illustrates a side view of an image capture device in a deployed configuration.

FIG. 2A is a diagram that illustrates a side view of an image capture device 230 in a deployed configuration. As shown in FIG. 2A, the image capture device 230 has an extension member 236 and a lens 232 disposed within the extension member 236. The lens 232 is disposed proximal to an image sensor 234. The extension member 236 is movable with respect to a display bezel 214 of a display portion 210 of a computing device (only a top portion of the display portion 210 of the computing device is shown). In some embodiments, the image capture device 230 may or may not have a cover (e.g., a retractable cover, a shutter cover) for the lens 232 and attached to the extension member 236 (or the display bezel 214).

In this embodiment, the image capture device 230 includes a mechanical mechanism configured to cause the image capture device 230 to be biased to the deployed configuration. Specifically, in this embodiment, the image capture device 230 can include springs 235 that apply a force (along direction F1) against a portion of the extension member 236 to cause the extension member 236 to be in a deployed position as shown in FIG. 2A. The extension member 236 can include protrusions 237 that are configured to function as a stop so that the extension member 236 is not pushed outside of the display bezel 214 by the springs 235 (which are in an expanded configuration).

In some embodiments, different types of mechanical mechanisms can be configured to cause the image capture device 230 to be biased to the deployed configuration. For example, one or more flexible (and elastic) polymer-based and/or metallic components can be configured to apply a force along direction F1 to cause the extension member 236 to be biased to the deployed position shown in FIG. 2A. As a specific example, a leaf-spring assembly can be used to bias the image capture device 230 to the deployed configuration.

Figure 2B:
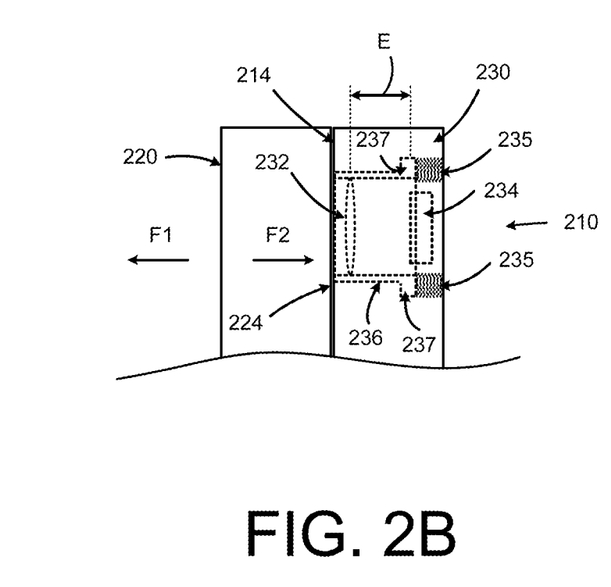
FIG. 2B is a diagram that illustrates a side view of the image capture device shown in FIG. 2A in a stowed configuration.

FIG. 2B is a diagram that illustrates a side view of the image capture device 230 shown in FIG. 2A in a stowed configuration. As shown in FIG. 2B, the extension member 236 of the image capture device 230 is disposed within the display portion 210 (e.g., the display bezel 214 of the display portion 210) when the image capture device 230 is in the stowed configuration. When in the stowed configuration, the springs 235 are in a contracted configuration and the extension member 236 is maintained in a position by applying a force along direction F2 which is in a direction opposite the force applied by the springs 235 along direction F1.

When the image capture device 230 is moved to the stowed configuration, the lens 232 included within the extension member 236 is moved toward the image sensor 234, so that a distance E between the lens 232 and the image sensor 234 is decreased. Accordingly, when the image capture device 230 is in the deployed configuration shown in FIG. 2A the distance E has a value that is greater than a value of the distance E when the image capture device 230 is in the stowed configuration shown in FIG. 2B.

Because the image capture device 230 is biased to the deployed configuration in this embodiment, the image capture device 230 is moved to the stowed configuration when the base portion 220 of the computing device is in a closed position with respect to the display portion 210 of the computing device as shown in FIG. 2B. When the base portion 220 is in the closed position with respect to the display portion 210, the base portion 220 (e.g., a surface 224 of the base portion 220) maintains the image capture device 230 in the stowed configuration. Specifically, the base portion 220 prevents the springs 235 of the image capture device 230 from pushing the extension member 236 to a deployed position.

In some embodiments, the image capture device 230 can be moved from the deployed configuration to the stowed configuration in response to the base portion 220 is moved to a closed position with respect to the display portion 210. In such embodiments, the surface 224 of the base portion 220 can apply a force (along direction F2) against a proximal portion of the extension member 236 (and in a direction opposite the force of the springs 235) to cause the extension member 236 to move to a stowed position within the display portion 210.

Because the image capture device 230 is biased to the deployed configuration in this embodiment, the image capture device 230 is moved from the stowed configuration to the deployed configuration when the base portion 220 of the computing device is no longer maintaining the image capture device 230 in the stowed configuration. In other words, when the base portion 220 is moved from the closed position to an open position so that the surface 224 of the base portion 220 is no longer in contact with the extension member 236, the extension member 236 can be moved to the deployed position. Said differently, the extension member 236 can pop-out to the deployed configuration when the base portion 220 is moved away from the image capture device 230. In some embodiments, the movement of image capture device 230 from the stowed configuration to the deployed configuration in response to the movement of the base portion 220 away from the display portion 210 can be referred to as automatically deploying the image capture device 230.

In some embodiments, the automatic deployment of the image capture device 230 can be dampened by one or more dampeners (not shown). In other words, the image capture device 230 can be configured so that the extension member 236 deploys (e.g., extends out of) from the display portion 210 at a specified rate. In some embodiments, one or more dampeners (e.g., friction components) can be included in the image capture device 230 so that the rate of deployment of the extension member 236 will be slower than a rate of deployment of the extension member 236 caused by the springs 235 without the dampeners.

In some embodiments, the image capture device 230 can include a latch (not shown) that maintains the image capture device 230 in the stowed configuration and/or the deployed configuration. In such embodiments, the latch can maintain the image capture device 230 in the stowed configuration even when the base portion 220 is moved from the closed position to an open position so that the surface 224 the base portion 220 is no longer in contact with the proximal end (e.g., front end) of the extension member 236. The latch can include a release mechanism (e.g., a release lever) configured to release the image capture device 230 so that the image capture device 230 can move from the stowed configuration to the deployed configuration in response to the release mechanism being actuated. Thus, after the image capture device 230 has been latched by the latch in the stowed configuration, the image capture device 230 can be released to automatically move from the stowed configuration to the deployed configuration.

In some embodiments, the latch can be configured to automatically latch the image capture device 230 in the stowed configuration when the base portion 220 moves the image capture device 230 from the deployed configuration to the stowed configuration. For example, the image capture device 230 can be in the deployed configuration (when the computing device is in an open configuration). The base portion 220 can be moved toward the display portion 210 (and against the proximal end of the extension member 236) until the base portion 220 is in a closed position with respect to the display portion 210 so that the image capture device 230 is moved to the stowed configuration. In response to being moved to the stowed configuration, the latch can be configured to automatically latch the image capture device 230 in the stowed configuration. Accordingly, even after the base portion 220 is moved away from the display portion 210, the image capture device 230 may be maintained in the stowed configuration by the latch until the latch is released using, for example, a release mechanism.

In some embodiments, the image capture device 230 can include a mechanical mechanism (e.g., a biasing mechanism) (not shown) configured to cause the image capture device 230 to be biased to the stowed configuration (rather than the deployed configuration). In such embodiments, a latch (not shown) can be configured to maintain the image capture device 230 in a deployed configuration (after being moved to the deployed configuration using, for example, a movement mechanism) until the latch is released. When the latch is released, the image capture device 230 can be rapidly moved to the stowed configuration using the mechanical mechanism biasing. Although not shown, the image capture device 230 can include, for example, one or more springs that apply a force (along direction F2) to cause the extension member 236 to be biased to a stowed configuration. In some embodiments, different types of mechanical mechanisms can be configured to cause the image capture device 230 to be biased to the stowed configuration. For example, one or more flexible (and elastic) polymer-based and/or metallic components can be configured to apply a force along direction F2 to cause the extension member 236 to be biased to the stowed position.

The image capture device 230 can be configured to be moved from the deployed configuration to the stowed configuration in a relatively quick fashion in response to the base portion 220 being moved to a closed position with respect to the display portion 210. Specifically, the image capture device 230 can be configured to be moved from the deployed configuration to the stowed configuration without being damaged when the computing device is rapidly closed. For example, when the computing device is rapidly closed, the surface 224 the base portion 220 can apply a force (along direction F2) against a proximal portion of the extension member 236 (and in a direction opposite the force of the springs 235) to cause the extension member 236 to move to a stowed position within the display portion 210.

In some embodiments, the image capture device 230 can be configured to be moved between a deployed configuration (e.g., one or more deployed configurations) and a stowed configuration in response to an indicator (e.g., a signal) from, for example, one or more sensors (e.g., an accelerometer, a proximity sensor, a gyroscope). For example, the image capture device 230 can be configured to be moved from the deployed configuration to the stowed configuration in response to a sensor (e.g., a proximity sensor, an accelerometer) detecting that the computing device 200 (e.g., a tablet computing device, a laptop device) has been dropped and may come into contact with an object (e.g., a floor, a tabletop). In some embodiments, the image capturing capabilities (e.g., the focusing capabilities) of the image capture device 230 can be used to detect that image capture device 230 should be retracted (e.g., retracted when dropped). In some embodiments, a sensor included in the display portion 210 and/or the base portion 220 of the computing device 200 can be used to detect that the computing device 200 is being changed from an open configuration to a closed configuration. In such embodiments, the image capture device 230 can be moved between the deployed configuration and the stowed configuration in response to one or more signals produced by the sensor.

In some embodiments, the image capture device 230 can be rapidly moved to a stowed configuration using a mechanical mechanism (not shown) in response to, for example, the computing device 200 being dropped or coming into contact with an object (e.g., a floor, a tabletop). The mechanical mechanism can bias the image capture device 230 to the stowed configuration (rather than the deployed configuration). In such embodiments, a latch (not shown) that is configured to maintain the image capture device 230 in a deployed configuration (after being moved to the deployed configuration using, for example, a movement mechanism) can be released when the computing device 200 is, for example, dropped so that the image capture device 230 is rapidly moved to the stowed configuration using the mechanical mechanism. The latch can be released in response to one or more sensors indicating that the computing device 200 has been, for example, dropped.

As shown in FIG. 2B, when the image capture device 230 is in the stowed configuration, at least a portion of the extension member 236 is disposed around the image sensor 234. Thus, an inner diameter of the extension member 236 is greater than a surface area of the image sensor 234. In some embodiments, a surface area of an image sensor associated with the image capture device 230 can be greater than an inner diameter of the extension member 236 (and/or an outer diameter of the extension member 236). In some embodiments, multiple image captures devices, such as image capture device 230, can be included within the display portion 210 and/or the base portion 220.

Figure 3A:
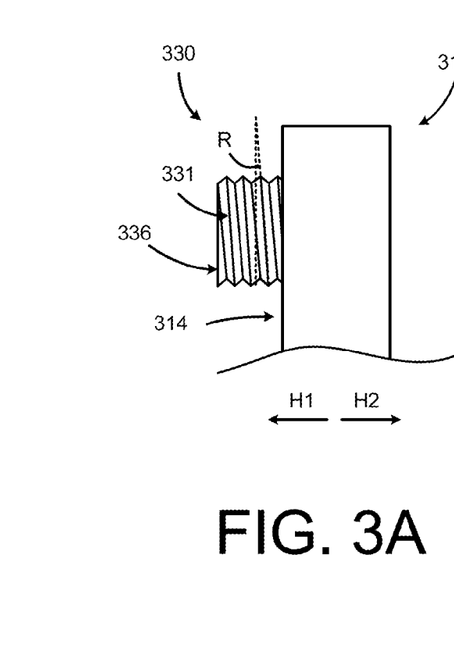
FIGS. 3A and 3B are diagrams that each illustrate a side view of an image capture device in a deployed configuration.
Figure 3B:
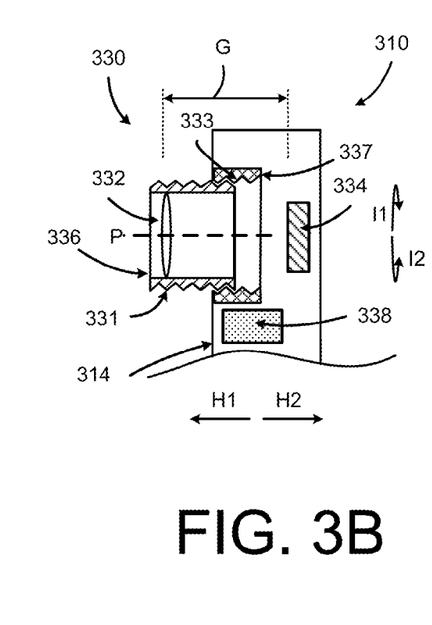
Figure 3C:
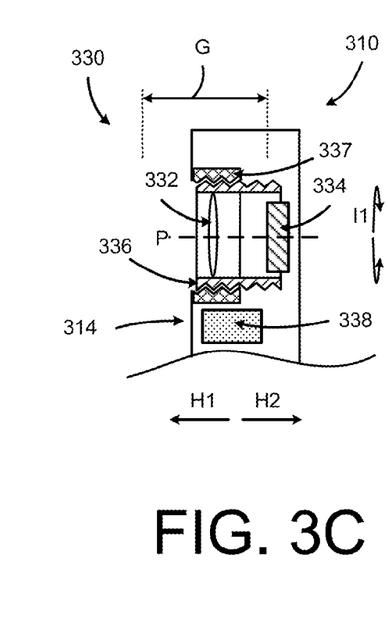
FIG. 3C is a diagram that illustrates the image capture device shown in FIGS. 3A and 3B in a stowed configuration.

FIGS. 3A and 3B are diagrams that each illustrate a side view of an image capture device 330 in a deployed configuration. As shown in FIG. 3A, the image capture device 330 has an extension member 336 with at least a portion disposed outside of the display bezel 314 of the display portion 310 of a computing device (only a top portion of the display portion 310 of the computing device is shown in FIGS. 3A through 3C). The extension member 336 defines (or has) a threaded portion 331 on the outside of the extension member 336.

FIG. 3B illustrates a cross-sectional side view of the image capture device 330 shown in FIG. 3A in the deployed configuration. In this embodiment, a lens 332 is disposed within the extension member 336, and is disposed proximal to (in front of) the image sensor 334.

FIG. 3C is a diagram that illustrates the image capture device 330 shown in FIGS. 3A and 3B in a stowed configuration. As shown in FIG. 3C, the extension member 336 and the lens 332 of the image capture device 330 are disposed within the display portion 310 (e.g., the display bezel 314 of the display portion 310) when the image capture device 330 is in the stowed configuration.

In this embodiment, the image capture device 330 includes a rotating mechanism 337 that has a threaded portion 333 configured to contact (e.g., be engaged with) the threaded portion 331 of the extension member 336. The extension member 336 is configured to move along direction H1 when the rotating mechanism 337 is rotated in direction I2. The extension member 336 moves along direction H1 when the rotating mechanism 337 is rotated in the direction I2 based on the relative movement of the interlocking threaded portion 333 of the rotating mechanism 337 and the threaded portion 331 of the extension member 336. The extension member 336 is configured to move along direction H2 when the rotating mechanism 337 is rotated in a direction I1 (which is opposite the direction I2). In this embodiment, the direction I1 and the direction I2 are disposed within a plane orthogonal to (or substantially orthogonal to) a longitudinal axis P of the extension member 336.

As shown in FIGS. 3B and 3C, a movement mechanism 338 is configured to cause the rotational movement of the rotating mechanism 337. Specifically, the movement mechanism 338 can be configured to cause the rotating mechanism 337 to rotate along direction I2 to cause the extension member 336 to be move along direction H2 from the deployed configuration to the stowed configuration. Also, the movement mechanism 338 can be configured to cause the rotating mechanism 337 to rotate along direction I1 to cause the extension member 336 to move along direction H1 from the deployed configuration to the stowed configuration. In some embodiments, the movement mechanism 338 can be, for example, a motor that can be associated with one or more gears, pulleys and/or so forth. In some embodiments, the movement mechanism 338 can be used as a focusing mechanism and/or a zoom mechanism for the image capture device 330.

When the image capture device 330 is moved to the stowed configuration, the lens 332 included within the extension member 336 is moved toward the image sensor 334, so that a distance G between the lens 332 and the image sensor 334 is decreased. Accordingly, when the image capture device 330 is in the deployed configuration shown in FIGS. 3A and 3B the distance G has a value that is greater than a value of the distance G when the image capture device 330 is in the stowed configuration shown in FIG. 3C.

In some embodiments, only a portion of the extension member 336 can have a threaded portion. Although not shown, in some embodiments, the extension member 336 can have a threaded portion on an inside portion of the extension member 336 in addition to, or instead of, on an outside portion of the extension member 336 as shown in FIGS. 3A through 3C. Accordingly, the movement mechanism 337 can have threading that can engage with the threading on the outside portion of the extension member 336.

In some embodiments, the image capture device 330 can be configured to move (e.g., automatically move) to the deployed configuration in response to the computing device being moved (or starting to be moved) to an open configuration from a closed configuration. In some embodiments, the image capture device 330 can be configured to move (e.g., automatically move) to the stowed configuration to the deployed configuration in response to the computing device being moved to, or starting to be moved to, the closed configuration from the open configuration. In some embodiments, the image capture device 330 can be configured to move (e.g., automatically move) to the stowed configuration to the deployed configuration while the computing device is being moved to the closed configuration from the open configuration.

In some embodiments, the threaded portion 331 of the extension member 336 and the threaded portion 337 of the movement mechanism 338 can have a relatively steep threading that can cause the extension member 336 to rapidly move between the stowed configuration and the deployed configuration. For example, the angle R can be greater than that shown in FIG. 3A. Specifically, the angle R can be greater than 15 degrees (e.g., 35 degrees, 45 degrees, 60 degrees).

In some embodiments, the threaded portion 331 of the extension member 336 and the threaded portion 337 of the movement mechanism 338 can have a steep thread so that the if the computing device is rapidly closed (e.g., slammed shut) (before the image capture device 330 can be mechanistically retracted), the base portion 320 can push against the extension member 336 to move (e.g., slidably move) (along direction H2 and along direction I2) the extension member 336 to a stowed position. If the threading is not steep, the extension member 336 may not readily move to the stowed position (and may be damaged) when the computing device is rapidly closed and the base portion 320 is moved against the extension member 336. In some embodiments, the image capture device 330 can be rapidly moved to a stowed configuration using a mechanical mechanism (not shown) biasing the image capture device 330 to the stowed configuration.

In some embodiments, the image capture device 330 can have a release mechanism configured to permit the extension member 336 to be moved rapidly to the stowed position from the deployed position when the computing device is rapidly closed. For example, the image capture device 330 can have a release mechanism configured to disengage the extension member 336 from, for example, the rotating mechanism 337 so that the extension member 336 can be rapidly moved from the deployed position to the stowed position when the computing device is closed within a short period of time. In some embodiments, one or more portions of the image capture device 330 can be, for example, disengaged from the movement mechanism 338 so that the extension member 336 can be rapidly moved from the deployed position to the stowed position when the computing device is closed within a short period of time. In some embodiments, multiple image captures devices, such as image capture device 330, can be included within a display portion 310 and/or a base portion (not shown).

Figure 4:
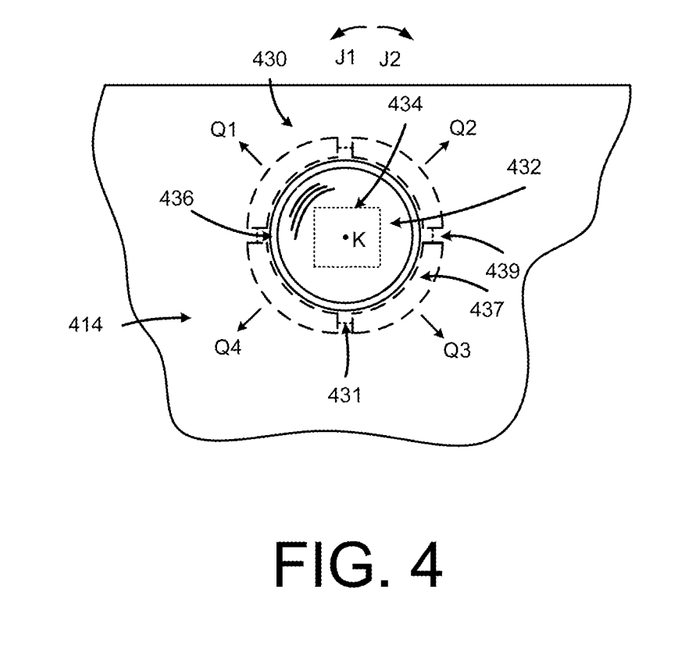
FIG. 4 is a diagram that illustrates a front view of an image capture device that includes a release mechanism, according to an embodiment.

FIG. 4 is a diagram that illustrates a front view of an image capture device 430 that includes a release mechanism (e.g., a slip clutch), according to an embodiment. The image capture device 430 is operably coupled to a display bezel 414 of a computing device (not shown). In this embodiment, the release mechanism is a mechanical release mechanism. As shown in FIG. 4, an extension member 436 of the image capture device 430 includes a threaded portion 431 (similar to the threaded portion 331 of the extension member 336 shown in FIGS. 3A through 3C), and a lens 432 is associated with (e.g., included in) the extension member 436. Also, the rotating mechanism 437 of the image capture device 430 can include a threaded portion (not shown) (similar to the threaded portion 333 of the rotating mechanism 337 shown in FIGS. 3A through 3C). An image sensor 434 (represented by dashed lines) is disposed behind (distal to) the lens 432.

The rotating mechanism 437 that has a threaded portion 433 configured to contact the threaded portion 431 of the extension member 436. The extension member 436 is configured to move in an axial direction along axis K away from the image sensor 434 (out of the page) when the rotating mechanism 437 is rotated in direction J1, and in an axial direction along axis K toward the image sensor 434 (into the page) when the rotating mechanism 437 is rotated in direction J2. In some embodiments, the rotating mechanism 437 can be configured to rotate in response to a movement mechanism (not shown) (e.g., motor).

As shown in FIG. 4, the rotating mechanism 437 includes slots 439. Because the rotating mechanism 437 includes slots 439, portions of the rotating mechanism 437 are configured to flex outward (away from the extension member 436) along directions Q1 through Q4 when the extension member 436 is rapidly moved in an axial direction along axis K toward the image sensor 434 (into the page) (if the extension member 436 is in a deployed position). Specifically, the threaded portion 431 of the extension member 436 is pushed against the portions of the rotating mechanism 437 and cause the portions of the rotating mechanism 437 to flex outward along directions Q1 through Q4 to allow the extension member 436 to be rapidly moved in the axial direction along axis K toward the image sensor 434 (into the page). The release mechanism can be configured to permit the extension member 436 to move axial along the direction K towards the image sensor (disposed behind the extension member 436) in response to a force being applied against the extension member 436 independent of a rotatable movement via the threaded portion 431 (which can be caused by the rotating mechanism 437). Thus, if the computing device including the image capture device 430 is rapidly closed, the image capture device 430 may not be damaged through the use of the release mechanism of the image capture device 430. In some embodiments, multiple image captures devices, such as image capture device 430, can be included within a display portion and/or a base portion.

Figure 5A:
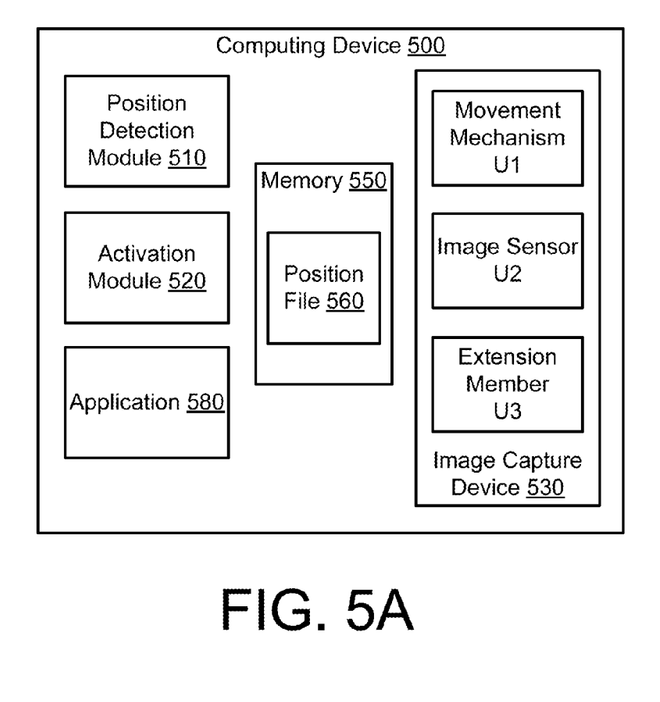
FIG. 5A is a block diagram that illustrates a computing device.

FIG. 5A is a block diagram that illustrates a computing device 500. Although not shown in FIG. 5A, the computing device 500 can include a display portion and a base portion. The display portion, which can include a display, can be movably coupled (e.g., rotatably coupled) to the base portion, which can include an input device region.

As shown in FIG. 5A, the computing device 500 includes an image capture device 530 (or multiple image capture devices) that includes a movement mechanism U1, an image sensor U2, and an extension member U3. The movement mechanism U1, the image sensor U2, and the extension member U3 can be included in a display portion of the computing device 500. The movement mechanism U1, the image sensor U2, and the extension member U3, can be similar to the components of the image capture devices described above. The movement mechanism U1 can be configured to move at least a portion of the extension member U3 between a stowed position and a deployed position. Although not shown in FIG.

5A, the extension member U3 can be associated with (e.g., coupled to, include) at least one lens configured to direct the light to the image sensor U2.

The computing device 500 includes a position detection module 510, an activation module 520, and an application 580. The position detection module 510 can be configured to detect (e.g., determine) a position (or configuration) of the display portion and/or the base portion. For example, the position detection module 510 can be configured to detect whether the display portion is in a closed position with respect to the base portion (so that the computing device 500 is in a closed configuration). The position detection module 510 can also be configured to detect (e.g., determine) a precise position (e.g., an angle) of the display portion with respect to the base portion when the computing device 500 is in an open configuration.

The activation module 520 is configured to trigger the image capture device 530 to move between a deployed configuration and a stowed configuration. For example, in some embodiments, the activation module 520 can be configured to trigger (e.g., trigger activation of) the movement mechanism U1 to move the extension member U2 between a deployed position and a stowed position. Specifically, the activation module 520 can be configured to trigger the movement mechanism U1 to move the extension member U2 in response to one or more indicators from the position detection module 510. For example, the activation module 520 can be configured to trigger the movement mechanism U1 to move the extension member U2 from a deployed position to a stowed position in response to an indicator (from the position detection module 510) that the computing device 500 is being moved (and/or has started moving) from the open configuration to the closed configuration.

In some embodiments, the position detection module 510 can be configured to activate (e.g., change to an active/on state or operational state), or deactivate (e.g., changed to a deactivated/off state or standby state) the movement mechanism U1 based on a position file 560 stored in a memory 550. The position file 560 can include information indicating whether the movement mechanism U1 should be activated or deactivated (or prevented from moving) when the computing device 500 is in the specified position.

Figure 5B:
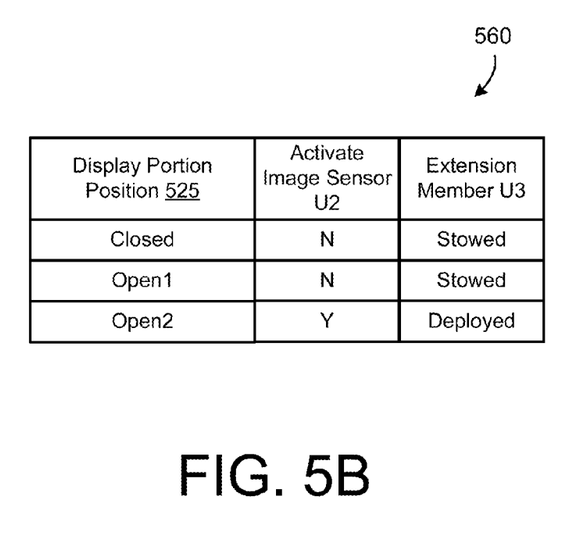
FIG. 5B illustrates a position file that can be stored in a memory of the computing device shown in FIG. 5A.

For example, the position detection module 510 can be configured to determine that the display portion of the computing device 500 is being moved from the closed position with respect to the base portion. The position detection module 510 can send an indicator that the display portion of the computing device 500 is being moved from the closed position to the activation module 520 (or the activation module 520 can be configured to request information about the position of the computing device 500). The activation module 520 can be configured to activate the movement mechanism U1 to cause (or prevent) deployment of the image capture device 530 based on the indicator that the display portion of the computing device 500 is being moved from the closed position and based on information included in the position file 560. An example of a position file is shown in FIG. 5B.

The application 580 can be any application installed at and or operating at the computing device 500. In some embodiments, the application 580 can be, or can be associated with, an operating system application. In some embodiments, the application 580 can include one or more user interface components, and can be an application configured to process one or more images captured using the image sensor U2.

In this embodiment, the application 580 can be configured to trigger the image capture device 530 to perform one or more functions. For example, the application 530 can be configured to trigger activation of the movement mechanism U1 so that the image capture device 530 is moved between the stowed configuration and the deployed configuration.

In some embodiments, the extension member U3 may be moved between a deployed position and a stowed position in response to the activation state (e.g., an activated state, a deactivated state) of the image sensor U2. The activation state of the image sensor U2 can be triggered in response to the application 580. For example, the extension member U3 may be moved from a stowed position to a deployed position by the activation module 520 in response to the application 580 triggering activation of (or use of) the image sensor U2. Similarly, the extension member U3 may be moved from the deployed position back to the stowed position by the activation module 520 in response to the application 580 changing the image sensor U2 to a deactivated state.

In some embodiments, the image capture device 530 may be prevented from moving between the stowed configuration and the deployed configuration when the computing device 500 is in a specified configuration. For example, the image capture device may be prevented from changing from the deployed configuration to the stowed configuration when the computing device is in a specified open configuration (e.g., an open configuration where the display portion of the computing device 500 is at a specified angle with respect to the base portion of the computing device 500).

FIG. 5B illustrates a position file 560 that can be stored in the memory 550 of the computing device 500 shown in FIG. 5A. As shown in FIG. 5B, the position file includes indicators of activation of the image sensor U2 and positions of the extension member U3 (which can be attained in response to the movement mechanism U1). The display portion positions 550 include a closed position and two open positions—open1 and open2. The open positions can be open positions at different angles between the display portion of the computing device 500 and the base portion of the computing device 500.

For example, when the display portion of the computing device 500 is in a closed position, the position file 560 indicates that the image sensor U2 should be deactivated as indicated by "N" and that the extension member U3 should be in the stowed position. When the display portion of the computing device 500 is in open1 position, the position file 560 indicates that the image sensor U2 should be deactivated as indicated by "N" and that the extension member U3 should be in the stowed position. When the display portion of the computing device 500 is in open2 position, the position file 560 indicates that the image sensor U2 should be activated as indicated by "Y" and that the extension member U3 should be in the deployed position.

In some embodiments, the position file 560 can be a default position file that is stored in the memory 550 of the computing device 500. In some embodiments, one or more portions of the position file 560 can be defined by (e.g., customized by), for example, a user of the computing device 500.

Referring back to FIG. 5A, the position detection module 510 can be configured to determine that at least a portion of the computing device 500 is in a particular position based on the positions (e.g., relative positions, combinations of positions) of physical components (e.g., display portion, base portion) of the computing device 500. For example, the position detection module 500 can be configured to determine that a display portion of the computing device 500 is in an open position in response to the display portion of the computing device 500 being rotated less than 90 degrees with respect to a base portion of the computing device 500.

In some embodiments, the position of a display portion of the computing device 500 with respect to a base portion of the computing device 500 can be determined based on signals from, for example, a series of electrical contacts, mechanical switches, etc. In some embodiments, a rotational position of a display portion of the computing device 500 with respect to a base portion of the computing device 500 can be determined based on signals from, for example, a series of electrical contacts, mechanical switches, etc. around a hinge portion coupled to the display portion of the computing device 500. In some embodiments, movement to a specified point (e.g., a specified rotational position with respect to a base portion of the computing device 500), beyond a point, and/or so forth, can be detected using a mechanical switch that can be actuated, an electrical contact, and/or so forth.

In some embodiments, the extension member U3 is configured to move (e.g., translate) only within a portion of a range of the movement of the display portion with respect to the base portion. For example, in some embodiments, the extension member U3 may not be configured to move (e.g., deploy, retract) when an angle between the display portion (e.g., a display of the display portion) and the base portion (e.g., an input device region of the base portion) is less than a specified angle (e.g., 30 degrees, 60 degrees, 90 degrees, 120 degrees, 150 degrees), and the extension member U3 may be configured to move (e.g., deploy, retract) when the angle between the display portion and the base portion is greater than or equal to the specified angle. In some embodiments, a specified angle can be referred to as a threshold angle.

As a specific example, in some embodiments, in response to the computing device 500 being changed from the closed configuration (such as the closed configuration shown in FIG. 1D) to the open configuration (such as that shown in FIG. 1C) the extension member U3 is configured to move when an angle between the display portion and the base portion is less than a specified angle (e.g., 30 degrees, 60 degrees, 90 degrees, 120 degrees, 150 degrees). The extension member U3 can be configured to move (e.g., deploy, retract) as the angle between the display portion and the based portion changes while less than the specified angle.

As another specific example, in some embodiments, in response to the computing device 500 being changed from the closed configuration (such as the closed configuration shown in FIG. 1D) to the open configuration (such as that shown in FIG. 1C) the extension member U3 is configured to deploy (e.g., start deploying) in response to the display portion 520 being initially rotated from the closed configuration (e.g., started to be moved towards the open configuration) a few degrees to a slightly open position. After the extension member U3 has deployed (e.g., translated), the extension member U3 may or may not further deploy as the display portion is rotated from the slightly open position to a fully open position (e.g., beyond a 70 degree angle) with respect to the base portion.

In some embodiments, one or more portions of the components shown in the computing device 500 in FIG. 5A can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the position detection module 510 can be, or can include, a software module configured for execution by at least one processor (not shown). In some embodiments, the functionality of the components can be included in different modules and/or components than those shown in FIG. 5A. For example, although not shown, the functionality of the position detection module 510 can be included in a different module than the position detection module 510, or divided into several different modules (not shown).

In some embodiments, the computing device 500 can be included in a network. In some embodiments, the network can include multiple computing devices (such as computing device 500) and/or multiple server devices (not shown). Also, although not shown in FIG. 5, the computing device 500 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Memory 550 can be any type of memory device such as a random-access memory (RAM) component or a disk drive memory. As shown in FIG. 5, the memory 550 is a local memory included in the computing device 500. Although not shown, in some embodiments, the memory 550 can be implemented as more than one memory component (e.g., more than one RAM component or disk drive memory) within the computing device 500. In some embodiments, the memory 550 can be, or can include, a non-local memory (e.g., a memory not physically included within the computing device 500) within a network (not shown). For example, the memory 550 can be, or can include, a memory shared by multiple computing devices (not shown) within a network. In some embodiments, the memory 550 can be associated with a server device (not shown) on a client side of a network and can be configured to serve several computing devices on the client side of the network.

Figure 6:
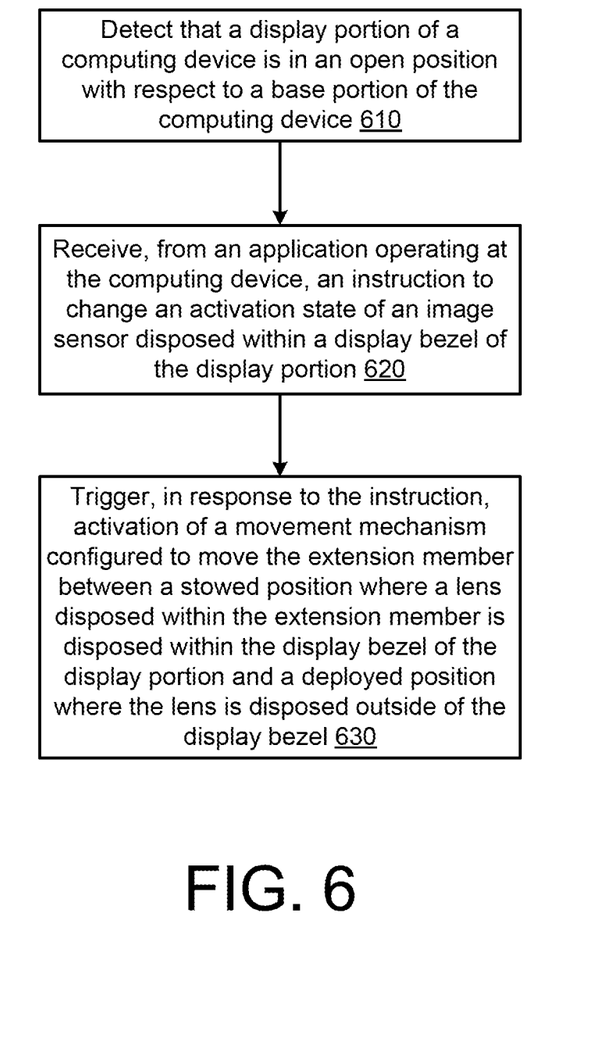
FIG. 6 is a flowchart that illustrates a method for triggering activation of a movement mechanism associated with an image capture device.

FIG. 6 is a flowchart that illustrates a method for triggering activation of a movement mechanism associated with an image capture device (or multiple image capture devices). The method shown in FIG. 6 can be used in conjunction with any of the movement mechanisms described above (e.g., movement mechanism 338 shown in FIG. 3).

As shown in FIG. 6, an open position of a display portion of a computing device with respect to a base portion of the computing device can be detected (block 610). In some embodiments, the open position can be detected by the position detection module such as position detection module 510 shown in FIG. 5A. In some embodiments, the display portion of the computing device can be rotatably coupled to the base portion of the computing device. Accordingly, the display portion of the computing device can be rotatably moved to the open position with respect to the base portion of the computing device.

An instruction to change an activation state of an image sensor disposed within a display bezel of the display portion can be received from an application operating at the computing device (block 620). The instruction to change the activation state of the image sensor can be produced by an application such as application 580 shown in FIG. 5A. The image sensor can be similar to, or the same as, image sensor U2 shown in FIG. 5A. In some embodiments, the image sensor can be changed from a deactivated state to an activated state, or vice versa.

In response to the instruction, activation of a movement mechanism configured to move the extension member between a stowed position where a lens disposed within the extension member is disposed within the display bezel of the display portion and a deployed position where the lens is disposed outside of the display bezel can be triggered (block 630). In some embodiments, the movement mechanism can be similar to, or the same as, the movement mechanism U1 shown in FIG. 5A, and the extension member can be similar to, or the same as, the extension member U3 shown in FIG. 5A. In some embodiments, the extension member can be moved between the stowed position and the deployed position based one or more entries in a position file (such as position file 560 shown in FIG. 5). In some embodiments, the extension member can be configured to move between the deployed configuration and the stowed configuration in response to movement between the display portion and the base portion of the computing device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a light emitting diode (LED) (e.g., organic LED) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computing device, comprising:
a base portion;
a display portion moveably coupled to the base portion, the display portion including a display bezel and an image sensor disposed within the display bezel;
an extension member coupled to the display portion and associated with a lens, the extension member configured to move at least a portion of the lens in a direction away from the image sensor to a position disposed outside of the display bezel and to move the portion of the lens in a direction towards the image sensor to a position disposed within the display bezel; and
a release mechanism configured to flex away from the extension member when a force is applied to the extension member.

2. The computing device of claim 1, wherein the portion of the lens is in the position disposed within the display bezel when the base portion and the display portion collectively define a closed configuration, the portion of the lens is in the position disposed outside of the display bezel when the base portion and the display portion collectively define an open configuration.

3. The computing device of claim 1, wherein the display portion is rotatably coupled to the base portion, the extension member is configured to move the portion of the lens to the position disposed outside of the display bezel in response to the display portion being rotatably moved away from a closed position with respect to the base portion toward an open position with respect to the base portion.

4. The computing device of claim 1, wherein the portion of the lens is disposed within a medial portion of the extension member, the medial portion of the extension member is disposed outside of the display bezel when the portion of the lens is in the position disposed outside of the display bezel and the medial portion of the extension member is disposed within the display bezel when the portion of the lens is in the position disposed within the display bezel.

5. The computing device of claim 1, wherein the extension member is biased to move the portion of the lens to the position disposed outside of the display bezel, the portion of the lens is moved to the position disposed within the display bezel in response to at least a portion of the base portion contacting the extension member such that the extension member is moved toward the image sensor.

6. The computing device of claim 1, wherein the display portion is rotatably coupled to the base portion,
the computing device further comprising:
a movement mechanism configured to move the extension member so that the portion of the lens is moved to the position disposed within the display bezel in response to the display portion being rotatably moved toward a closed position with respect to the base portion.

7. The computing device of claim 1, further comprising:
a movement mechanism configured to move the extension member along the direction away from the image sensor in response to the image sensor changing to an activated state, the movement mechanism configured to move the extension member along the direction towards the image sensor in response to the image sensor changing to a deactivated state.

8. The computing device of claim 1, wherein the extension member includes a threaded portion,
the computing device further comprising:
a rotating mechanism with a threaded portion that contacts the threaded portion of the extension member, the release mechanism including slots that allow portions of the rotating mechanism to flex away from the extension member, permitting the extension member to move along the direction towards the image sensor in response to the force, the force being independent of a rotatable movement via the rotating mechanism.

9. A computing device, comprising:
a base portion including an input region;
a display portion movably coupled to the base portion, the display portion including a display bezel around a display surface and including an image sensor disposed within the display bezel; and
an extension member associated with a lens and configured to be in a stowed position when the display portion and base portion collectively define a closed configuration where the display surface faces the input region of the base portion,
the extension member configured to be in a deployed position when the display portion and the base portion collectively define an open configuration after the display portion is rotated away from the base portion, the lens and the image sensor being separated by a distance when in the deployed position that is greater than a distance between the lens and the image sensor when the extension member is in the stowed position; and
a release mechanism configured to flex away from the extension member when the extension member is moved into the stowed position.

10. The computing device of claim 9, wherein at least a portion of the lens is on a first side of a wall defined by the display bezel when the extension member is in the stowed position, the at least the portion of the lens is on a second side of the wall defined by the display bezel when the extension member is in the deployed position.

11. The computing device of claim 9, wherein the display portion is rotatably coupled to the base portion, the extension member is prevented from moving from the stowed position to the deployed position until the display portion is rotatably moved away from the base portion such that the display portion is moved from a closed position to an open position, the display surface of the display portion being aligned along a plane substantially parallel to a plane along which a bottom surface of the base portion is aligned when the display portion and the base portion are in the closed configuration.

12. The computing device of claim 9, wherein the display portion is rotatably coupled to the base portion, the extension member is configured to move to the deployed position in response to the display portion being rotatably moved away from a closed position with respect to the base portion towards an open position with respect to the base portion.

13. The computing device of claim 9, further comprising:
a movement mechanism configured to move the extension member between the deployed position and the stowed position in response to the display portion being rotatably moved between an open position with respect to the base portion and a closed position with respect to the base portion.

14. The computing device of claim 9, further comprising:
a movement mechanism configured to move the extension member to the deployed position in response to the image sensor changing to an activated state, the movement mechanism configured to move the extension member to the stowed position in response to the image sensor changing to a deactivated state.

15. The computing device of claim 9, wherein the extension member includes a focusing mechanism.

16. The computing device of claim 9, wherein the extension member is configured to be moved to the deployed position using a spring mechanism.

17. The computing device of claim 9, wherein the extension member is configured to be moved to the stowed position by a biasing mechanism.

18. The computing device of claim 9, wherein the release mechanism includes a slot disposed between portions of a rotating mechanism in contact with the extension member, the slots enabling the rotating mechanism to flex away from the extension member.

19. The computing device of claim 9, wherein the extension member includes a threaded portion, and the computing device further comprises:
a rotating mechanism with a threaded portion contacting the threaded portion of the extension member, the release mechanism including a slot disposed between portions of the threaded portion of the rotating mechanism, the extension member causing the portions of the threaded portion of the rotating mechanism to flex away from the extension member when the threaded portion of the extension member pushes on the threaded portion of the rotating mechanism in response to a force being applied against the extension member independent of a rotatable movement via the rotating mechanism.

20. An apparatus, comprising:
a display bezel around a display surface of a tablet computing device and including an image sensor disposed within the display bezel;
an extension member coupled to the display bezel and including a lens, the extension member configured to move at least a portion of the lens in a direction away from the image sensor to a position disposed outside of the display bezel and to move the at least the portion of the lens in a direction towards the image sensor to a position disposed within the display bezel;

a movement mechanism configured to move the extension member between the position disposed outside of the display bezel and the position disposed within the display bezel; and a release mechanism configured to flex away from the extension member when the extension member is moved into a stowed position.

21. The apparatus of claim 20, wherein the release mechanism is configured to disengage the extension member from a rotating mechanism.

22. The apparatus of claim 20, wherein the release mechanism includes a slot disposed between portions of a rotating mechanism, the portions of the rotating mechanism being in contact with the extension member.

23. The apparatus of claim 20, wherein the extension member includes a threaded portion, and the apparatus further comprises:

a rotating mechanism with a threaded portion contacting the threaded portion of the extension member, the release mechanism including a slot disposed between portions of the rotating mechanism, the extension member configured to move along the direction towards the image sensor in response to a force applied to the extension member independent of a rotatable movement via the rotating mechanism.

* * * * *

UNITED STATES PATENT AND TRADEMARK OFFICE
CERTIFICATE OF CORRECTION

| | | |
|---|---|---|
| PATENT NO. | : 8,814,447 B1 | Page 1 of 1 |
| APPLICATION NO. | : 13/152732 | |
| DATED | : August 26, 2014 | |
| INVENTOR(S) | : William Hamburgen | |

It is certified that error appears in the above-identified patent and that said Letters Patent is hereby corrected as shown below:

On the title page, in item (75) under "Inventor", in line 3, delete "Hambergen" and insert --Hamburgen--, therefor.

Signed and Sealed this
Eighteenth Day of November, 2014

Michelle K. Lee
*Deputy Director of the United States Patent and Trademark Office*